Jan. 9, 1934.   J. N. STEWART   1,943,096
AUTOMATIC RECLOSING CIRCUIT BREAKER SYSTEM
Filed Dec. 2, 1932
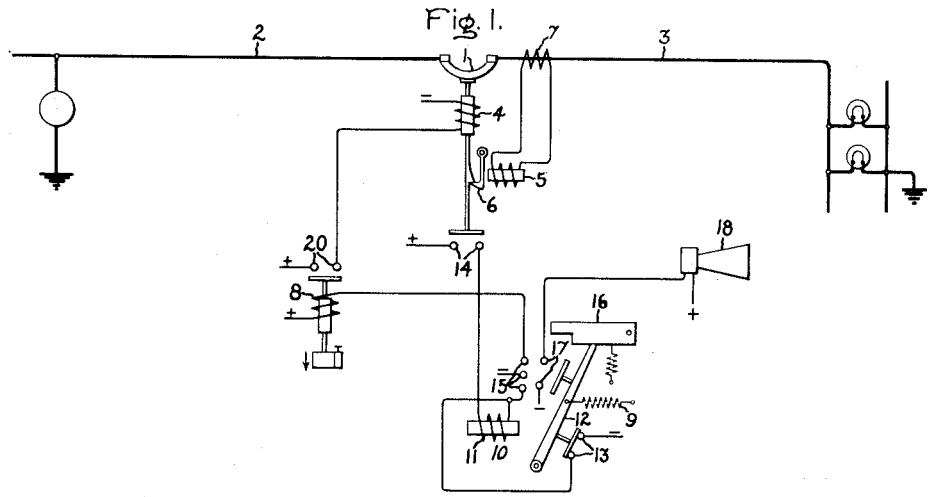
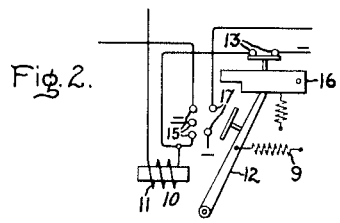
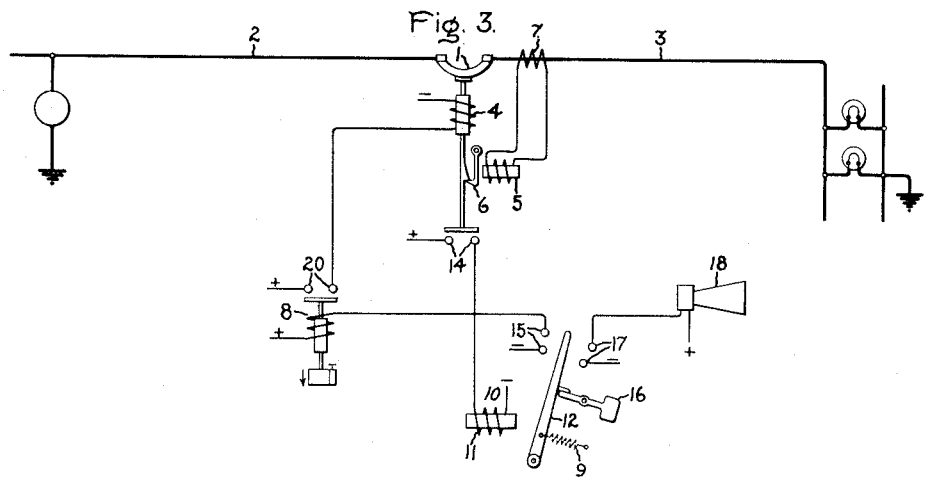
Inventor:
James N. Stewart,
by Charles E. Mullen
His Attorney.

Patented Jan. 9, 1934

1,943,096

UNITED STATES PATENT OFFICE 1,943,096

AUTOMATIC RECLOSING CIRCUIT BREAKER SYSTEM

James N. Stewart, Birmingham, Ala., assignor to General Electric Company, a corporation of New York Application December 2, 1932. Serial No. 645,435

9 Claims. (Cl. 175—294)

My invention relates to automatic reclosing circuit breaker systems and its object is to provide an improved arrangement for effecting a single instantaneous reclosure of a circuit breaker.

In accordance with my invention, I provide a relay which is so arranged that normally it is in a condition to effect the immediate reclosing of the circuit breaker in response to the opening thereof and which is rendered inoperative to effect another reclosure of the circuit breaker in case it reopens after the first reclosure thereof.

My invention will be better understood from the following description when taken in connection with the accompanying drawing and its scope will be pointed out in the appended claims.

In the accompanying drawing, Fig. 1 diagrammatically illustrates an automatic reclosing circuit breaker system embodying one modification of my invention; Fig. 2 illustrates a modified construction of the reclosing relay shown in Fig. 1, and Fig. 3 diagrammatically illustrates an automatic reclosing circuit breaker system embodying another modification of my invention.

Referring to Fig. 1, 1 represents a circuit breaker which is arranged to connect a supply circuit 2 to a load circuit 3. The circuit breaker 1 may be of any suitable type, examples of which are well known in the art. As shown in the drawing, the circuit breaker 1 is of the well known latched-in type and includes a closing coil 4 which, when energized, closes the circuit breaker and a trip coil 5 which, when energized, releases a latch 6 that holds the circuit breaker 1 in its closed position. As shown, the trip coil 5 is connected in series with the secondary winding of a current transformer 7, the primary of which is connected in series with the circuits 2 and 3 when the circuit breaker 1 is closed. The trip coil 5 is arranged to effect the opening of the circuit breaker 1 when the current through the circuit breaker exceeds a predetermined value.

The circuit of the closing coil 4 is controlled by means of an auxiliary relay 8 of the well known hesitating type so that the circuit of the closing coil 4 is maintained completed for a sufficient length of time to complete the closing operation of the circuit breaker.

In order to effect a single instantaneous reclosure of the circuit breaker when it opens in response to the operation of the trip coil 5, I provide, in accordance with my invention, a reclosing relay 10 having a winding 11 and a movable armature 12 which is normally maintained by suitable biasing means, such as a spring 9, in such a position that it can be attracted by the winding 11 when it is energized. The circuit of the winding 11 includes the normally closed contacts 13 of the relay 10 and the circuit breaker auxiliary contacts 14 which are closed when the circuit breaker 1 is open. With the movable armature 12 in its normal position, as shown in the drawing, the circuit for the winding 11 is completed in response to the opening of the circuit breaker 1. When the armature 12 is attracted by the winding 11, it moves to a position in which it closes the normally open contacts 15 so as to complete an energizing circuit for the auxiliary relay 8 and a locking circuit for the winding 11. This locking circuit is independent of the contacts 13 which are opened by the armature 12 leaving its normal position. Associated with the armature 12 is a movable stop member 16 which may be arranged in any suitable manner so that it allows the armature to move from its normal position to its attracted position when the winding 11 is energized but stops the armature in a position intermediate its normal position and its attracted position when the winding 11 is subsequently deenergized. When the armature 12 is in its intermediate position, it closes the contacts 17 in the circuit of a suitable electromagnetically operated signaling device 18 so as to give at a remote point a signal indicating that a single instantaneous reclosure of the circuit breaker 1 has taken place.

The operation of the arrangement shown in Fig. 1 is as follows: When the circuit breaker 1 is closed and the current through the circuit breaker exceeds a predetermined value, the trip coil 5 releases the latch 6 and effects the opening of the circuit breaker. The closing of the auxiliary contacts 14 on the circuit breaker 1 completes a circuit for the winding 11 of relay 10 through the normally closed contacts 13 of the relay. The energization of the winding 11 effects the movement of the armature 12 to its attracted position in which position the contacts 15 are closed to complete a locking circuit for the winding 11 and an energizing circuit for the winding of the auxiliary relay 8. By closing its contacts 20, relay 8 completes an energizing circuit for the closing coil 4 so as to effect the closing of the circuit breaker 1. By opening its auxiliary contacts 14 the circuit breaker 1 interrupts the holding circuit for the winding 11 so that the spring 9 moves the armature 12 towards its normal position. In moving towards its attracted position, however, the armature 12 releases the stop member 16 so that it operates to stop the return movement of the armature in a position intermediate the normal position and the attracted position thereof. In its intermediate position the armature 12 maintains the contacts 17 closed so that the signaling device 18 is operated.

Since the contacts 13 of the relay 10 are maintained open while the armature 12 is held in its intermediate position, the winding 11 cannot be energized again until the stop member 16 is manually operated to restore the armature 12 to its normal position. Therefore, if the circuit breaker 1 should open again after its first reclosure, it is prevented from being automatically reclosed.

In the modification of my invention shown in Fig. 2, the contacts 13 of the relay 10 are arranged to be opened by the movement of the stop member 16 instead of by the armature 12 directly.

In the modification of my invention shown in Fig. 3, the normally closed contacts 13 in the energizing circuit of the winding 11 are omitted and the armature 12 is normally held by the stop member 16 and the spring 9 in a position between the contacts 15 and 17, said intermediate position being such that the armature can be attracted by the winding 11 when it is energized. The stop member 16 is arranged in any suitable manner so that it is released in response to the movement of the armature 12 to its attracted position and moves out of the path of movement of the armature 12. Therefore, when the winding 11 is deenergized in response to the closing of the circuit breaker 1, the spring 9 moves the armature 12 to a position from which it cannot be attracted by the energization of the winding 11 and in which it closes the contact 17 in the circuit of the signaling means 18.

The operation of the modification shown in Fig. 3 is as follows: When the circuit breaker 1 opens, its auxiliary contacts 14 complete an energizing circuit for the winding 11 of relay 10 so that the armature 12 moves from its normal position to its attracted position. In its attracted position the armature 12 closes the contacts 15 so that the auxiliary relay 8 is energized. By closing its contacts 20, the relay 8 completes an energizing circuit for the closing coil 4 to effect the closing of the circuit breaker 1. By opening its auxiliary contacts 14 the circuit breaker 1 interrupts the energizing circuit of the winding 11 so that the spring 9 moves armature 12 towards its normal position. In moving towards its attracted position, the armature 12 releases the stop member 16 so that it moves out of the path of movement of the armature. Therefore, the spring 9 moves the armature through its normal position to a position in which the contacts 17 are closed to effect the operation of the signaling means 18. When the armature 12 is in this deenergized position, the air gap between the armature and the winding 11 is so large that the subsequent energization of the winding 11 in response to the opening of the circuit breaker 1 does not produce sufficient torque on the armature 12 to overcome the torque exerted by biasing means 9. Therefore, the armature 12 remains in its deenergized position until it is manually restored to its normal position and held in that position by the stop member 16.

While I have, in accordance with the patent statutes, shown and described my invention as applied to a particular system and as embodying various devices diagrammatically indicated, changes and modifications will be obvious to those skilled in the art and I, therefore, aim in the appended claims to cover all such changes and modifications as fall within the true spirit and scope of my invention.

What I claim as new and desire to secure by Letters Patent of the United States is:

1. In combination, a circuit breaker, means for opening said circuit breaker, means for closing said circuit breaker including a relay having a winding and a movable member normally in a predetermined position and arranged to be operated from said predetermined position to a second position in response to the energization of said winding, means responsive to the opening of said circuit breaker for effecting the energization of said winding, means controlled by said member when moved to said second position for effecting the closing of said circuit breaker and the deenergization of said winding, means for moving said member from said second position when said winding is deenergized, and means controlled by the movement of said member from said predetermined position to said second position for effecting the movement of said member from said second position to a third position in which said relay is rendered inoperative to effect a reclosure of said circuit breaker in response to a subsequent opening thereof.

2. In combination, a circuit breaker, means for opening said circuit breaker, and means for controlling the closing of said circuit breaker including a relay having a winding and armature normally in a predetermined position and arranged to be operated from said predetermined position to a second position in response to the energization of said winding, means responsive to the opening of said circuit breaker for effecting the energization of said winding, means controlled by said armature when moved to said second position for effecting the closing of said circuit breaker and the deenergization of said winding, means for moving said armature from said second position when said winding is deenergized, and a movable stop for said armature controlled by the movement thereof from said predetermined position to said second position so that said last mentioned means effects the movement of said armature to a third position in which said relay is rendered inoperative to effect a reclosure of said circuit breaker in response to a subsequent opening thereof.

3. In combination, a circuit breaker, means for opening said circuit breaker, closing means for said circuit breaker, and means for controlling said closing means including a relay having a movable element normally in a predetermined position, a winding for said relay arranged to be deenergized when said circuit breaker is closed and to be energized in response to the opening of said circuit breaker to effect the movement of said movable member from its normal position to a second position in which it effects the operation of said closing means, and means for effecting the movement of said member from said second position to a third position from which said member cannot be moved by said winding in response to a subsequent opening of said circuit breaker.

4. In combination, a circuit breaker, means for opening said circuit breaker, closing means for said circuit breaker and means for controlling said closing means including a relay having a winding, a circuit for said winding, contacts in said circuit controlled by said circuit breaker so that they are closed when said circuit breaker is open to effect the energization of said winding and open when said circuit breaker is closed to effect the deenergization of said winding, a movable member normally in a predetermined position and arranged to be moved to a second position in response to the energization of said winding, means controlled by said member when in said second position for effecting the operation of said closing means for said circuit breaker, means for moving said member from said second position when said winding is deenergized, and means controlled by the movement of said member from its normal position to its second position for controlling said movement of said member from said second position so that said member stops in a third position from which said member cannot be moved by said winding in response to a subsequent opening of said circuit breaker.

5. In combination, a circuit breaker, means for opening said circuit breaker, and means for controlling the closing of said circuit breaker including a relay having a winding and a movable member normally in a predetermined position and arranged to be operated from said predetermined position to a second position in response to the energization of said winding, means responsive to the opening of said circuit breaker for effecting the energization of said winding, means controlled by said member when moved to said second position for effecting the closing of said circuit breaker and the deenergization of said winding, means for moving said member from said second position when said winding is deenergized, means controlled by the movement of said member from said predetermined position to said second position for effecting the movement of said member from said second position to a third position in which said relay is rendered inoperative to effect a reclosure of said circuit breaker in response to a subsequent opening thereof, signaling means, and means controlled by said member for effecting the operation of said signaling means when said member is in said third position.

6. In combination, a circuit breaker, means for opening said circuit breaker, and means for controlling the closing of said circuit breaker including a relay having a winding and an armature having a normal position and a second position to which it is moved in response to the energization of said winding, means responsive to the opening of said circuit breaker for effecting the energization of said winding, means controlled by said armature when moved to said second position for effecting the closing of said circuit breaker and the deenergization of said winding, means for moving said member from said second position when said winding is deenergized, means controlled by the movement of said armature from said normal position to said second position for stopping said last mentioned movement of said armature in a position intermediate said normal and second positions, and means controlled by said armature for preventing the energization of said winding in response to the opening of said circuit breaker when said armature is in said intermediate position.

7. In combination, a circuit breaker, means for opening said circuit breaker, and means for controlling the closing of said circuit breaker including a relay having a winding and an armature having a normal position and a second position to which it is moved in response to the energization of said winding, means responsive to the opening of said circuit breaker for effecting the energization of said winding, means controlled by said armature when moved to said second position for effecting the closing of said circuit breaker and the deenergization of said winding, means for moving said member from said second position when said winding is deenergized, means controlled by the movement of said armature from said normal position to said second position for stopping said last mentioned movement of said armature in a position intermediate said normal and second positions, signaling means, and means controlled by said armature for effecting the operation of said signaling means and for preventing the energization of said winding in response to the opening of said circuit breaker when said armature is in said intermediate position.

8. In combination, a circuit breaker, means for opening said circuit breaker, and means for controlling the closing of said circuit breaker including a relay having a winding and an armature having a normal position and a second position to which it is moved in response to the energization of said winding, a circuit for said winding including contacts closed by said armature when in its normal position, means responsive to the opening of said circuit breaker for effecting the energization of said circuit, means controlled by said armature when moved to said second position for effecting the closing of said circuit breaker and the deenergization of said winding, means for moving said armature from said second position when said winding is deenergized, and a movable stop for said armature controlled by the movement of said armature from its normal position to said second position for stopping the movement of said armature by said last mentioned means in a position in which said contacts in the circuit of said winding are open.

9. In combination, a circuit breaker, means for opening said circuit breaker, and means for controlling the closing of said circuit breaker including a relay having a winding and an armature having a normal position and a second position to which it is moved in response to the energization of said winding, a circuit for said winding including contacts closed by said armature when in its normal position, means responsive to the opening of said circuit breaker for effecting the energization of said circuit, means controlled by said armature when moved to said second position for effecting the closing of said circuit breaker and the deenergization of said winding, means for moving said armature from said second position when said winding is deenergized, signaling means, a movable stop for said armature controlled by the movement of said armature from its normal position to said second position for stopping the movement of said armature by said last mentioned means in a position intermediate said normal and second positions so that said contacts in the circuit of said winding are maintained open, and means controlled by said armature for effecting the operation of said signaling means when said armature is in said intermediate position.

JAMES N. STEWART.